US010594976B1

(12) United States Patent
Lentz

(10) Patent No.: US 10,594,976 B1
(45) Date of Patent: Mar. 17, 2020

(54) WIDE FIELD OF VIEW (FOV) PROJECTION SYSTEM AND ASSOCIATED METHODS

(71) Applicant: Government of the United States, as represented by the Secretary of the Air Force, Wright-Patterson AFB, OH (US)

(72) Inventor: Joshua Lentz, Niceville, FL (US)

( * ) Notice: Subject to any disclaimer, the term of this patent is extended or adjusted under 35 U.S.C. 154(b) by 0 days.

(21) Appl. No.: 16/257,703

(22) Filed: Jan. 25, 2019

(51) Int. Cl.
*G03B 21/20* (2006.01)
*H04N 5/74* (2006.01)
*G02B 26/08* (2006.01)

(52) U.S. Cl.
CPC ....... *H04N 5/7458* (2013.01); *G02B 26/0816* (2013.01); *G03B 21/2066* (2013.01); *H04N 5/7441* (2013.01)

(58) Field of Classification Search
CPC .... G03B 21/008; G03B 21/28; G03B 21/208; G03B 21/2013; G03B 21/2033; G03B 21/2053; G03B 21/2066; H04N 5/3765; H04N 5/7441; H04N 5/7458; H04N 5/23232; H04N 5/23216
See application file for complete search history.

(56) References Cited

U.S. PATENT DOCUMENTS

| | | | |
|---|---|---|---|
| 6,008,951 A | 12/1999 | Anderson | |
| 6,099,128 A | 8/2000 | Jessl | |
| 6,412,972 B1 | 7/2002 | Pujol | |
| 6,654,156 B1 | 11/2003 | Crossland | |
| 7,116,380 B2 | 10/2006 | Welch | |
| 7,301,688 B2 | 11/2007 | Shreeve | |
| 7,370,973 B2 | 5/2008 | Sakaguchi | |
| 7,384,158 B2 | 6/2008 | Ramachandran | |
| 7,486,425 B2 | 2/2009 | Shreeve | |
| 7,498,648 B2 | 3/2009 | Richards | |
| 7,636,190 B2 | 12/2009 | Huibers | |
| 7,880,948 B2 | 2/2011 | Yamada | |
| 8,203,702 B1 | 6/2012 | Kane | |
| 8,752,969 B1 | 6/2014 | Kane | |

(Continued)

OTHER PUBLICATIONS

How projection mapping can add an extra dimension to your events, http://www.stagingconnections.com/events/How-projection-mapping-can-add-an-extra-dimension-to-your-events, Mar. 19, 2018.

(Continued)

*Primary Examiner* — Sultan Chowdhury
(74) *Attorney, Agent, or Firm* — AFMCLO/JAZ; David E. Franklin

(57) ABSTRACT

Systems and methods for wide field of view (FOV) image projection using a spatial light modulator (SLM) and a fast steering mirror (FSM) cooperatively managed by a projection sequence controller. The computer-implemented process determines projection regions within the FOV, creates sub-images of an input target image for each of the regions, and operates the SLM and FSM to time-division multiplex sequential projections of each of the sub-images and to direct each projection to a respective region in the FOV within an observer frame rate. The projection sequence controller determines the number projection regions within the FOV based on a projection frame time of the SLM (including a frame read-in time and a modulation time), a mirror steering time of the FSM, and the observer frame rate.

17 Claims, 3 Drawing Sheets

(56) References Cited

U.S. PATENT DOCUMENTS

| | | |
|---|---|---|
| 9,851,556 B2 | 12/2017 | Kotelnikov |
| 2002/0190922 A1 | 12/2002 | Tsao |
| 2003/0142274 A1 | 7/2003 | Gibbon |
| 2004/0001184 A1 | 1/2004 | Gibbons |
| 2005/0083565 A1 | 4/2005 | Yamazaki |
| 2006/0227086 A1 | 10/2006 | Lyst |
| 2007/0268544 A1 | 11/2007 | Ueyama |
| 2008/0239252 A1 | 10/2008 | Konno |
| 2011/0128602 A1 | 6/2011 | Hamano |
| 2012/0069304 A1* | 3/2012 | Kanazawa ............ G03B 21/006 353/20 |
| 2012/0229780 A1* | 9/2012 | Sato .................. G02B 19/0057 353/85 |
| 2014/0104618 A1 | 4/2014 | Potsaid |
| 2014/0253989 A1* | 9/2014 | Kurashige ............. G02B 27/48 359/15 |
| 2014/0327601 A1* | 11/2014 | Tilleman ................ G02B 5/30 345/7 |
| 2015/0181180 A1 | 6/2015 | Guthrie |
| 2016/0004219 A1 | 1/2016 | Leister |
| 2016/0073100 A1 | 3/2016 | Huang |
| 2016/0261838 A1* | 9/2016 | Ranieri ................. H04N 9/312 |
| 2016/0327783 A1 | 11/2016 | Xu |
| 2017/0269214 A1 | 9/2017 | Marron |
| 2018/0020199 A1 | 1/2018 | Yamamoto |
| 2018/0152678 A1 | 5/2018 | Richards |
| 2019/0273898 A1* | 9/2019 | Huang ................. H04N 9/312 |

OTHER PUBLICATIONS

Prejection Mapping, https://www.christiedigital.com/en-us/business/solutions/projection-mapping, downloaded from the internet on Jan. 8, 2019.

Dana Dudley, Walter Duncan, John Slaughter, "Emerging Digital Micromirror Device (DMD) Applications", DLPTM Products New Applications, http://www.ti.com/pdfs/dlpdmd/152_NewApps_paper_copyright.pdf, 2003.

* cited by examiner

US 10,594,976 B1

WIDE FIELD OF VIEW (FOV) PROJECTION SYSTEM AND ASSOCIATED METHODS

STATEMENT OF GOVERNMENT INTEREST

The invention described herein may be manufactured, used, and licensed by or for the Government of the United States for all governmental purposes without the payment of any royalty.

BACKGROUND

Projection mapping is a light manipulation technology that employs standard image projectors to display two-dimensional (2D) and/or three-dimensional (3D) images onto flat and/or irregularly-shaped display surfaces. Common projection mapping solutions designed to extend an image over a wide display space (referred herein as extended scene generation) typically employ multiple projectors controlled by specialized software and other technologies configured to warp and blend the projectors' outputs to seamlessly assemble a continuous, extended image across the desired area of the display space.

The display quality of a projection mapping implementation depends largely on the quality of the projectors used. Digitized image content is made up of a large number of individual points of light called "pixels." The more pixels a projector is capable of directing into a targeted display space, the more image detail will be perceptible in that display space. Resolution is the level of clarity that is achieved in a projected image. If a projection mapping solution employs a low-resolution projector, the result is enlarged pixels that the equipment is unable to project as densely into the display space boundary (i.e., resolution suffers).

The distance between a projector and a target image (also referred to herein as a target FOV) is another crucial element in achieving high-resolution projection mapping. In general, the greater the distance between the fixed-focus projector and a FOV, the larger the projected image will appear. However, image quality will be impacted as defined by the Inverse-Square Law which holds that the luminosity decreases in intensity the further a light beam must travel. In other words, the greater the throw distance, the less bright the display of the image upon the FOV will be.

One type of device employed in projection mapping is a spatial light modulator (SLM). Operation of an SLM involves imposition of some form of spatially-varying modulation on a projected beam of light. For example, SLM designs exist that modulate either the phase of a beam or both the beam intensity and the phase simultaneously. By using specialized software to drive such modulation, a two- or three-dimensional image may be spatially mapped on a virtual program which mimics the real environment upon which the image is to be projected. The software interacts with such a modulation device to fit a desired image onto the surface of a target FOV. This modulation technique may be used to add extra dimensions, optical illusions, and notions of movement onto previously static objects. However, as is the case with other projection solution types, wide FOV projection quality for systems that employ SLMs is limited by equipment performance characteristics and distance to target FOV.

Common methods of extended scene generation include the following: 1) direct projection into a perceiving device (such as a camera, eye, sensor, or specimen), and 2) projection onto an intermediate screen that diffusely reflects or transmits the light. Movie theaters utilize the latter format with a diffuser screen. Both methods are limited in the trade space that exists between angular resolution and FOV, the limiter being the number of pixels available in the SLM(s) used. For directly projected scenes, the problem of designing for extended scene generation reduces to a) providing more pixels through a common optical projection lens system, and b) providing the number of pixels without prohibitive cost. For projection onto an intermediate screen, in most cases the problem reduces to the cost element only. In the current state of the practice, high-performance projection equipment (e.g., infrared SLMs with associated projection lenses) can be prohibitively expensive for many consumers.

What is needed in the industry is an image projection solution for generation of large field of view (FOV) scenes at resolutions that rival the quality of common projection mapping solutions, but which employ a single SLM or similar projection component to reduce design cost.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
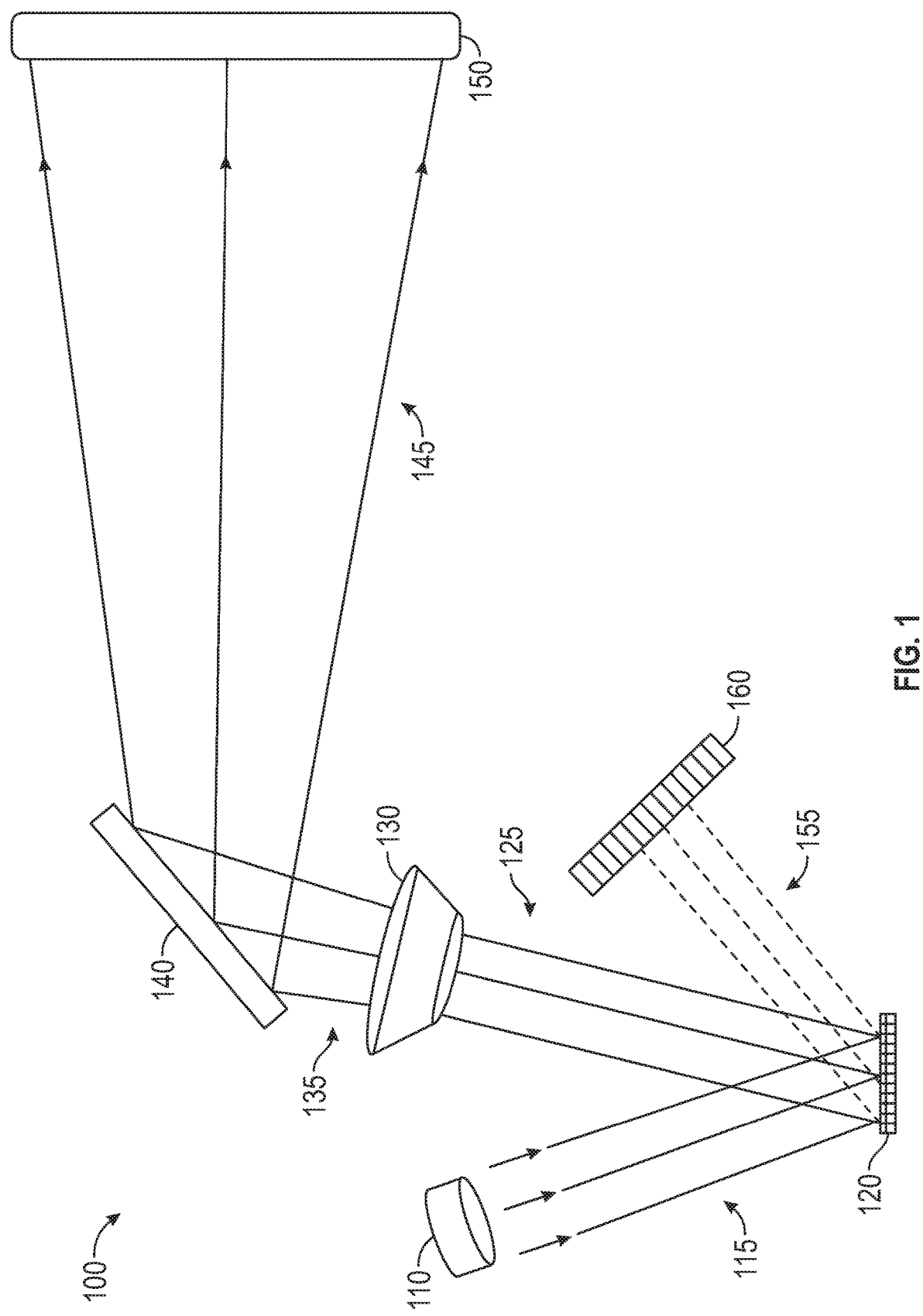
FIG. 1 is a schematic diagram of a wide field of view (FOV) projection system, in accordance with embodiments of the disclosure.

Specific embodiments of the disclosure will now be described in detail with reference to the accompanying figures. While this disclosure is susceptible of being embodied in many different forms, there is shown in the drawings and will herein be described in detail specific embodiments, with the understanding that the present disclosure is to be considered as an example of the principles of the described and not intended to limit the disclosure to the specific embodiments shown and described. In the description below, like reference numerals may be used to describe the same, similar or corresponding parts in the several views of the drawings.

The present disclosure relates generally to systems and associated methods for projection of extended imagery over a wide field of view (FOV). As used herein, the term "wide" FOV implies a FOV over which a conventional, single spatial light modulator (SLM) is incapable of projecting an image at a desired angular resolution per pixel. The invention described herein may achieve projection of a desired image over a wider FOV at a given angular resolution or at an increased angular resolution over a given FOV. The two problems are equivalent as addressed by the design presented.

The present design accomplishes extended scene generation through use of a spatial light modulator (SLM) and a fast steering mirror (FSM). A common projection sequence controller changes scene (via the SLM) and projection path (via the FSM) to populate a larger region in the field of view (FOV) than can be accomplished with single-scene projection using a single spatial light modulator. More specifically, the present design determines and populates multiple projection regions using a single SLM to project time-division multiplexed outputs and using the FSM to move the outputs of the SLM around the FOV.

Designing to a single SLM may advantageously reduce overall implementation costs compared to high-cost infrared test systems that employ SLMs that typically cost more than $500,000 per unit and yet are not able to produce the required projection field size at the resolution requirement described herein. At such unit prices, the present design may advantageously deliver a factor of 4× increase in high-resolution projection field size using a single SLM for that unit price of $500,000, thus saving upwards of $1,500,000 over conventional designs.

Referring more specifically to FIG. 1, an embodiment of a wide FOV projection system 100 will now be described in detail. For example, and without limitation, the system 100 may comprise a high speed SLM 120, a fast steering mirror (FSM) 140 and a high-speed controlling computer (described hereinbelow and in FIG. 4). The SLM 120 may create and project an output image 125 at the desired angular resolution for a particular region in a target FOV 150. The FSM 140 may direct the path 145 of the SLM output 125 to different regions of the FOV 150 with an appropriate image for each FOV region. The projection sequence controller (e.g., computer-implemented) may be configured to update the SLM output image 125 and to move the FSM 140 appropriately to populate the FOV 150. The process may operate to time-division multiplex the output 125 of the SLM 120 for generation of a larger FOV than allowed by a single SLM, analogous to a laser light show projector that creates a scene by moving a single spot around a target surface within the integration time of the observer. The present design may coordinate the operation of the SLM 120 and the FSM 140 to move a sequence of the time-division multiplexed output images 125 that comprise a desired scene around the FOV 150 within the integration time of an observing subject/device. Differences between the analogous laser light show projector and the present design include the following:

a) Unlike a laser light show which requires multiple lasers to add colors, the present design may support a wide spectral range.

b) Unlike a laser light show which uses a single point scanned around the field, the present design may use arrays of points (e.g., on the order of 1024×1024 or larger).

c) Unlike a laser light show which does not need to change a projection scene for each mirror position, the present design may require careful FSM and SLM synchronization.

Still referring to FIG. 1, in more detail, the present design may further comprise a single projection lens 130 positioned along a system optical axis between the SLM 120 and the FSM 140. The SLM 120 may be illuminated 115 by a light source 110 as input to creation of the output image 125, which may pass through (and, optionally, be conditioned by 135) the projection lens 130 before being directed by the FSM 140 to the target FOV 150 (e.g., display surface) where the extended image projection is observed. For example, and without limitation, the present design may be operable in the ultraviolet (UV), visible and infrared (IR) spectral regions.

Although the present design is generally directed to employment of a single projection component to map to larger spaces, the design may be complementary to known projection mapping solutions that employ multiple projectors (for example, the present design possesses inherent modularity in the way the FOV may be extended by addition of additional projection components and steering mirrors). The advantageous cost savings is most readily realized in infrared scene generation, where projection components (e.g., infrared SLMs with associated projection lenses) are very costly. Cost savings also increase, in general, as the relative frame rates of the projection components used and of the sensing device become more dissimilar with the sensing device having a slower rate.

By way of definition, a digital micromirror device (DMD) is a monolithic, micromechanical type of spatial light modulator (SLM) that may be employed in various embodiments of the present design. For example, and without limitation, FIG. 1 illustrates a DMD 120 projected to a display surface 150, where the FSM 140 may be moved between field locations to build up the FOV 150 using output 125 from the single DMD 120. DMDs comprise discrete, tilting mirror elements fabricated from sputter deposited aluminum directly on top of arrays of complementary metal-oxide semiconductor memory cells. The mirrors are switched between two stable tilted states according to whether a "1" (ON) or a "0" (OFF) is stored in the underlying memory location. An optical system illuminates the DMD and projects its image in such a way that the image of each mirror, which represents a single pixel in the projected image, is at full brightness when the mirror is tilted in the "1" state and full darkness when the mirror is tilted in the "0" state. The refresh rate of the memory and the response rate of the mirrors are high enough so that hundreds of memory frames can be displayed during one video frame, and so that each pixel can be ON or OFF in a binary fashion for a portion of the image frame proportional to that pixel's individual intensity. The digital-to-analog conversion of this intensity occurs in the eye/brain of the viewer.

For example, and without limitation, a DMD 120 may comprise an array of micromirrors on the order of 10 microns×10 microns. The mirrors may be configured to be individually addressed and may be tilted between two positions: one corresponding to incident light being directed 125 along the system optical axis (i.e., on-system), and the other position reflecting light 155 out of the system (i.e., off-system) to a beam dump or absorber 160. By rapidly flipping the mirrors of the DMD 120 between the two states, grayscale values may be created as a consequence of the total time the mirrors are directing light (that is, image output) 125 into the system 100. This process is known as pulse width modulation (PWM) and the number of bits of grayscale values obtainable is related to the device frequency of operation (e.g., higher frequency operation allows fewer gray levels to be generated).

Through use of filters and time multiplexing and/or through use of multiple DMDs in the present design, color mixing may be accomplished in addition to the intensity control obtained through PWM. Although disclosure herein of the present design focuses on fixed colors (i.e., a fixed ratio between color elements set by the DMD illumination source and kept constant), color mixing implementations may be used in conjunction with the present design. Use of a DMD also may advantageously provide great flexibility in setting grayscale bit depth, controlling limited pixel regions of interest, true binary operation (if important to an application), very fine pixel pitch, high product maturity, large technology infrastructure and relatively low cost.

Figure 2A:
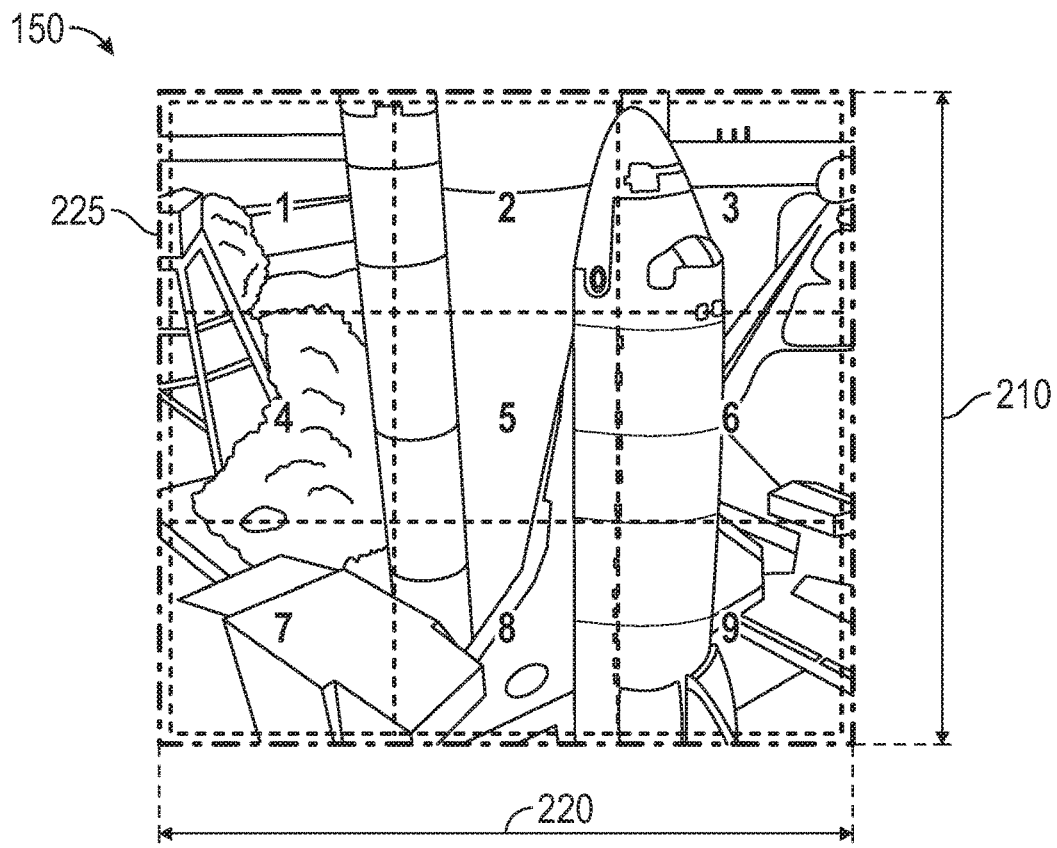
FIG. 2A is a graphic diagram illustrating exemplary projection regions produced by a wide FOV projection system, in accordance with embodiments of the disclosure.
Figure 2B:
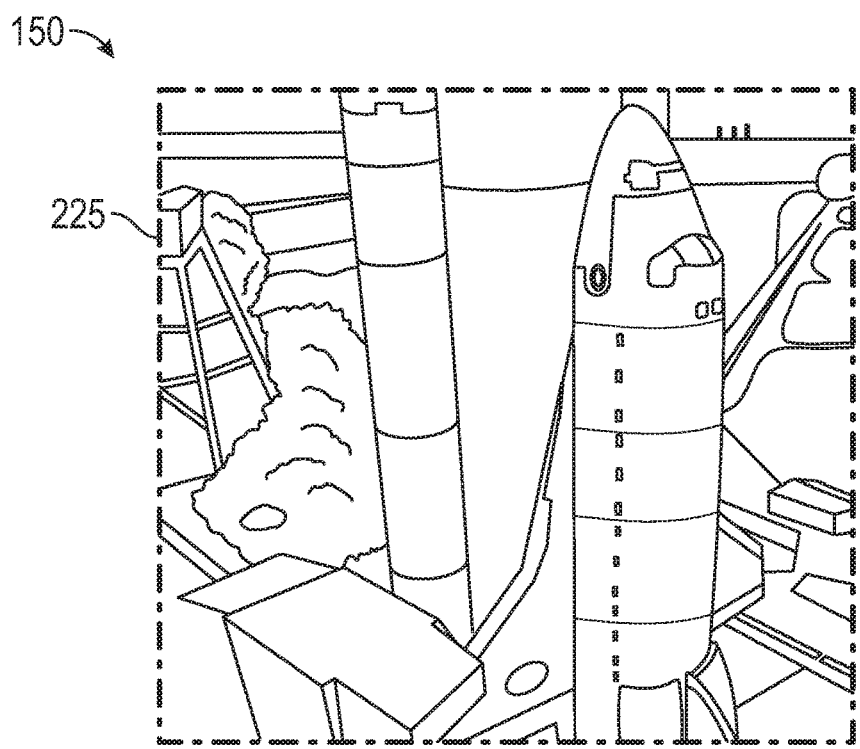
FIG. 2B is a graphic diagram illustrating an exemplary observed FOV formed from the projection regions of FIG. 2A.

Still referring to FIG. 1, and as described above, the image output 125 of the DMD 120 may be conditioned to have converging format, diverging format 135, or collimated format (i.e., parallel light rays). These effects may be accomplished through use of a lens 130 or lenslet array. In operation, the projection lens output 135 may be directed 145 sequentially to different locations in the FOV 150. For example, and without limitation, FIG. 2A illustrates a grid 210, 220 of 3×3 positions indicated in the FOV 150 for the DMD 120 to project to, each associated with its own unique portion (for example, corner region 225) of the image 255 being generated (shown in FIG. 2B). More specifically, sequential projections to various regions of the FOV 150, each projection comprising a respective unique portion of the image, are steered by the FSM 140 to build up the desired image 255 in the FOV 150. To ensure these time-division multiplexed projections appear as a single, uninterrupted image 255, each of the nine field regions in the grid 210, 220 may be appropriately projected (that is, with both correct sequencing and correct positioning) and the sequence set to restart within a single frame time of the observer (e.g., human, camera, device). Proper synchronization between the FSM 140 and the DMD 120 may advantageously avoid artifacts.

The number of field regions that may be projected with a single DMD (or other SLM) is dependent on the observation method, the FSM response time, the SLM employed and the number of gray levels needed. For example, and without limitation, for a 5-bit image (32 gray levels), a DMD is operable at approximately a 1 kHz frame rate. A 110 Hz frame rate is a reasonable video frame rate for human viewing. Therefore, for a 5-bit image quality video projected at 110 Hz, nine (9) field positions may be projected from a single DMD assuming a sufficiently high-performance FSM is used. For the cost of the FSM (approximately $2,000 at present), the field of view (FOV) of the projection system of the present design may be increased by a factor of three (3) in horizontal and vertical directions while maintaining the angular resolution of the original projection system.

For example, and without limitation, alternative embodiments of the present design may be characterized by the following features, either individually or in any combination:

1) a transmitting or reflecting SLM using alternative technologies (e.g. liquid crystal on silicon, cycloidal diffractive waveplates, photonic crystals) may be substituted for the reflective DMD;

2) a traditional Risley prism may be substituted for the FSM;

3) a photonic crystal beam steering system that functions as a Risley analogue may be substituted for the FSM;

4) the projection lens may be removed from the optical system to allow a reduction in overall size of the steering device;

5) a system of projection lenses may be fixed and the steering device may direct the SLM output to each corresponding projection lens in sequence;

6) a back-projection system may be utilized in which the diffuse screen may be transmissive rather than reflective;

7) the diffusing screen may be planar, curved in one dimension, or curved in two dimensions or any other shape;

8) the SLM may be replaced with an array of emitters such as light-emitting diode (LED), organic light-emitting diode (OLED), micro-lasers, and/or micro-resistors;

9) the light source may be narrow band, broad band, and/or multispectral;

10) the SLM may be replaced by a set of SLMs such that color control may be provided;

11) a chopper wheel or high-speed shutter may be used to aid in reducing synchronization artifacts or steering artifacts;

12) the projector lens may be replaced with a lenslet array to change the format of the SLM output;

13) the FSM may be of the form of a 1-D or 2-D galvanometer; and/or 14) multiple DMDs (or other SLMs) may be cascaded to allow higher dynamic range and/or higher frame rates (Note: this option trades cost for performance; for a DMD operated in binary mode, frame rates at high definition may be accomplished over 22 kHz to advantageously allow more grid locations to be replicated, at the expense of requiring more DMDs in series to gain gray levels).

Figure 3:
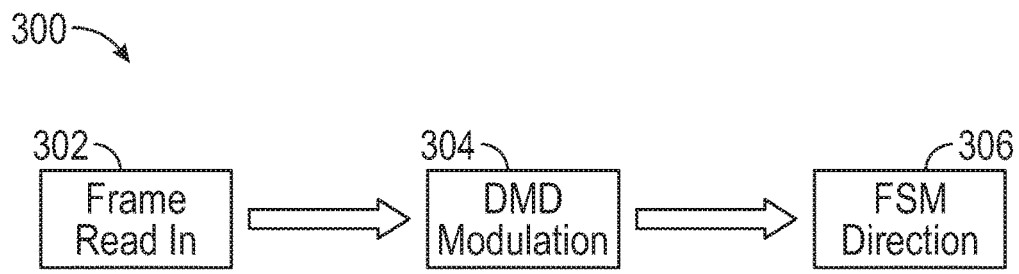
FIG. 3 is a flowchart of a wide FOV projection control process, in accordance with embodiments of the disclosure.

Referring now to FIG. 3, a method for controlling 300 projection of partitions of an image using time-division multiplexing of output of a single spatial light modulator (SLM) and direction of the SLM output by a fast steering mirror (FSM) to populate a wide field of view (FOV) will now be discussed in detail. More specifically, the method aspect of the present design comprises operating the SLM in cooperation with the FSM to move created image partitions about the FOV within the integration time of an observer. Timing is critical for proper operation of the present design, in that steering time (i.e., movement and settling time) of the FSM must be accounted for and synchronized to the SLM so that frames are correctly produced at each field region. For example, and without limitation, the SLM employed in the present design is assumed to be a DMD as shown in FIG. 3 and as used in the timing equations below.

Generally, for high-quality system components, the total time T for a frame projection action (also referred to herein as projection frame time) may be given as the sum of the SLM frame time ($t_{SLM}$) which includes the frame read-in time 302 and the modulation time 304, and the mirror steering time 306 ($t_{mirror}$). Because the SLM in FIG. 3 is presumed to be a DMD, this frame time is denoted as $t_{DMD}$, and the total time for a frame may be modelled as follows:

$$T = t_{DMD} + t_{mirror}$$

The corresponding projection frame rate $f_{proj}$ is the inverse of T. The total number of FOV regions that may be projected (N) within the observer frame rate ($f_{obs}$) may be modelled as follows:

$$N = \frac{f_{proj}}{f_{obs}} = \frac{t_{obs}}{(t_{DMD} + t_{mirror})}$$

The N field regions may be distributed as needed based on the application and need not be a square grid. For pre-set imagery, the controlling process may be simplified in that a single image file can be pre-processed for each DMD through frame division and re-sampling, as needed.

Figure 4:
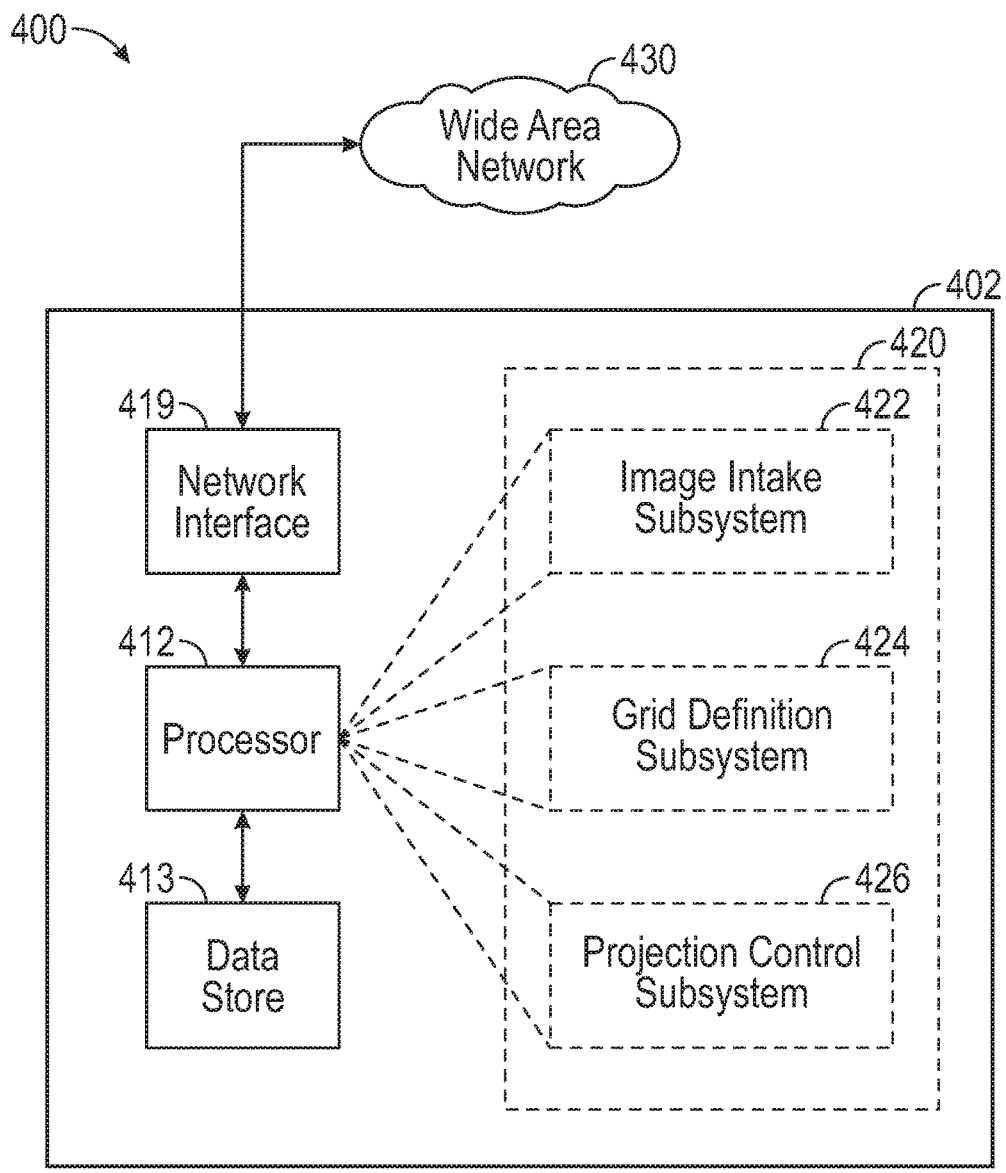
FIG. 4 is a schematic block diagram of a computer-implemented projection sequence controller for a wide FOV projection system, in accordance with embodiments of the disclosure.

Referring now to FIG. 4, a computer implementation of the method for controlling wide FOV projection, according to embodiments of the present design, will now be discussed in detail. For example, and without limitation, FIG. 4 shows a computer-implemented projection sequence controller 400 that includes computational device 402 that (optionally) may interface with a wide area network 430. The device 402 includes network interface 419, processor 412 and data store 413. Data store 413 includes subsystem module 420, which includes image intake subsystem 422, grid definition subsystem 424 and projection control subsystem 426.

Those skilled in the art will understand that the principles of the present disclosure may be implemented on or in data communication with any type of suitably arranged device or system configured to perform image projection operations, in any combination. Controller 400 of the present design may comprise a processor 412 that may be operable to accept and execute computerized instructions, and also a data store 413 (e.g., a non-transitory computer-readable storage medium) that may store data and instructions used by the processor 412. The processor 412 may be in data communication with external computing resources, such as the wide area network (WAN) 430, through a network interface 419. Furthermore, the processor 412 may be configured to direct input received from components of the WAN 430 to the data store 413 for storage. Similarly, the processor 412 may be configured to retrieve data from the data store 413 to be forwarded as output to various components of the WAN 430.

For example, and without limitation, one embodiment of the present design may comprise a computer-controlled process that may include the subprocesses of a) receiving an image to be projected onto an extended field of view (FOV), b) defining grid positions (i.e., regions) in the FOV to which the SLM is to project a respective unique sub-image of the desired image, c) setting a projection sequence for the full set of sub-images to restart within a single frame time of the observer; and d) projecting the sub-images to their associated regions in the FOV in keeping with the projection sequence. To carry out this computer-controlled process, the computerized instructions of the controller 400 may be configured to implement image intake subsystem 422 that may be stored in the data store 413 and retrieved by the processor 412 for execution. The image intake subsystem 422 may be operable to receive content desired for wide FOV projection as described above. Also, for example, and without limitation, the computerized instructions of the controller 400 may be configured to implement a grid definition subsystem 424 that may be stored in the data store 413 and retrieved by the processor 412 for execution. The grid definition subsystem 424 may be operable to create individual regions of projection for modulated transmission as described above. Also for example, and without limitation, the computerized instructions of the controller 400 may be configured to implement projection control subsystem 426 that may be stored in the data store 413 and retrieved by the processor 412 for execution. The projection control subsystem 426 may be operable to control the SLM, FSM, and/or other optical system components as described above.

Those skilled in the art will appreciate that the present disclosure contemplates the use of computer instructions and/or systems configurations that may perform any or all of the operations involved in wide FOV image projection. The disclosure of computer instructions that include image intake subsystem 422 instructions, grid definition subsystem 424 instructions, and projection control subsystem 426 instructions is not meant to be limiting in any way. Those skilled in the art will readily appreciate that stored computer instructions and/or systems configurations may be configured in any way while still accomplishing the many goals, features and advantages according to the present disclosure.

It will be appreciated that the systems and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (e.g., random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

The invention claimed is:

1. A system comprising:
a spatial light modulator (SLM);
a fast steering mirror (FSM); and
a projection sequence controller configured to:
receive a target image;
determine a plurality of projection regions within a field of view (FOV);
create a plurality of sub-images of the target image; and
operate, within an observer frame rate,
the SLM to time-division multiplex a respective projection of each of the plurality of sub-images, and
the FSM to direct each projection to a respective one of the plurality of projection regions within the FOV,
wherein the projection sequence controller is further configured to determine a number N of the plurality of projection regions within the FOV, defined as:

$$N = \frac{t_{obs}}{(t_{SLM} + t_{FSM})},$$

wherein $t_{SLM}$ denotes a projection frame time of the SLM, comprising a frame read-in time and a modulation time;
wherein $t_{FSM}$ denotes a mirror steering time of the FSM; and
wherein $t_{obs}$ denotes the observer frame rate.

2. The system according to claim 1, where the SLM is of a modulator type selected from the group consisting of a digital micromirror device (DMD), a photonic crystal, a cycloidal diffractive waveplate, and a liquid crystal on silicon.

3. The system according to claim 1, where the FSM is of a beam steering type selected from the group consisting of a Risley prism system, a photonic crystal beam steering system, a 1D galvanometer mirror system, and a 2D galvanometer mirror system.

4. The system according to claim 1, where the observer frame rate is within a range of approximately 50 frames per second to approximately 1000 frames per second.

5. The system according to claim 1, where the SLM is configured to:
receive an incident light;
direct a first portion of the incident light along an off-system optical path; and
direct a second portion of the incident light along an on-system optical path, to define one of the plurality of projections.

6. The system according to claim 1, further comprising a projection lens positioned between the SLM and the FSM along an on-system optical path and configured to condition at least one of the projections to comprise one of a converging format, a diverging format, and a collimated format.

7. The system according to claim 1, where at least one of the plurality of projections is of a type selected from the group consisting of two-dimensional (2D) and three-dimensional (3D).

8. The system according to claim 1, further comprising a diffusing screen having the projection regions of the FOV and having a surface type selected from the group consisting of planar, curved in one (1) dimension, and curved in two (2) dimensions.

9. A method of operating a system having a spatial light modulator (SLM), a fast steering mirror (FSM), and a projection sequence controller; the method comprising:
receiving, using the projection sequence controller, a target image;
determining, using the projection sequence controller, a plurality of projection regions within a field of view (FOV);
creating, using the projection sequence controller, a plurality of sub-images of the target image; and
operating, using the projection sequence controller, and within an observer frame rate,
the SLM to time-division multiplex a respective projection of each of the plurality of sub-images, and
the FSM to direct each projection to a respective one of the plurality of projection regions within the FOV,
wherein the method further comprises determining, using the projection sequence controller, a number N of the plurality of projection regions within the FOV, defined as:

$$N = \frac{t_{obs}}{(t_{SLM} + t_{FSM})},$$

where $t_{SLM}$ denotes a projection frame time of the SLM, comprising a frame read-in time and a modulation time;
where $t_{FSM}$ denotes a mirror steering time of the FSM; and
where $t_{obs}$ denotes the observer frame rate.

10. The method according to claim 9, where the SLM is of a modulator type selected from the group consisting of a digital micromirror device (DMD), a photonic crystal, a cycloidal diffractive waveplate, and a liquid crystal on silicon.

11. The method according to claim 9, where the FSM is of a beam steering type selected from the group consisting of a Risley prism system, a photonic crystal beam steering system, a 1D galvanometer mirror system, and a 2D galvanometer mirror system.

12. The method according to claim 9, where the observer frame rate is within a range of approximately 50 frames per second to approximately 1000 frames per second.

13. The method according to claim 9, further comprising:
receiving, using the SLM, an incident light;
directing, using the SLM, a first portion of the incident light along an off-system optical path; and
directing, using the SLM, a second portion of the incident light along an on-system optical path, to define one of the plurality of projections.

14. The method according to claim 13, further comprising positioning a projection lens between the SLM and the FSM along the on-system optical path; and conditioning, using the projection lens, at least one of the projections to comprise one of a converging format, a diverging format, and a collimated format.

15. The method according to claim 9, where at least one of the projections is of a type selected from the group consisting of two-dimensional (2D) and three-dimensional (3D).

16. A device having a computer processor operatively coupled to a non-transitory computer-readable storage medium and a plurality of instructions which, when executed by the computer processor, is configured to:
receive a target image;
determine a plurality of projection regions within a field of view (FOV);
create a plurality of sub-images of the target image; and
determine a projection sequence, defined as a time-division multiplex, within an observer frame rate, of a projection of each of the plurality of sub-images to a respective one of the projection regions within the FOV,
wherein the device further comprises instructions to determine a number N of the plurality of projection regions within the FOV, defined as:

$$N = \frac{t_{obs}}{(t_{SLM} + t_{FSM})},$$

where $t_{SLM}$ denotes a projection frame time of the SLM, comprising a frame read-in time and a modulation time;
where $t_{FSM}$ denotes a mirror steering time of the FSM; and
where $t_{obs}$ denotes the observer frame rate.

17. The device according to claim 16, further comprising instructions to:
operate a spatial light modulator (SLM) to time-division multiplex the respective projection of each of the plurality of sub-images; and
operate a fast steering mirror (FSM) to direct each projection to a respective one of the plurality of projection regions within the FOV.

* * * * *